United States Patent
Raupp

(10) Patent No.: US 7,342,376 B2
(45) Date of Patent: Mar. 11, 2008

(54) GLASS MACHINERY MOTOR CONTROL

(75) Inventor: Henry F. Raupp, Freeville, NY (US)

(73) Assignee: Emhart Glass SA, Cham (CH)

( * ) Notice: Subject to any disclaimer, the term of this patent is extended or adjusted under 35 U.S.C. 154(b) by 20 days.

(21) Appl. No.: 11/361,746

(22) Filed: Feb. 24, 2006

(65) Prior Publication Data

US 2007/0200526 A1    Aug. 30, 2007

(51) Int. Cl.
*G05B 19/29* (2006.01)
(52) U.S. Cl. .................. 318/600; 198/379; 65/163
(58) Field of Classification Search .............. 318/600, 318/375, 376, 379, 377, 378; 65/163; 198/379
See application file for complete search history.

(56) References Cited

U.S. PATENT DOCUMENTS

| | | | | |
|---|---|---|---|---|
| 4,364,764 A | * | 12/1982 | Farkas et al. ............... 65/29.1 |
| 4,958,223 A | * | 9/1990 | Juvinall et al. ............. 348/127 |
| 4,959,538 A | * | 9/1990 | Swart ..................... 250/223 B |
| 5,422,476 A | * | 6/1995 | Weber et al. ........... 250/223 B |
| 5,469,031 A | * | 11/1995 | Chorey ........................ 318/375 |
| 6,460,686 B1 | * | 10/2002 | Giometti et al. ......... 198/467.1 |
| 6,510,751 B2 | * | 1/2003 | Giometti .................... 73/865.8 |
| 6,848,564 B2 | * | 2/2005 | Nickey et al. .............. 198/379 |
| 7,170,245 B2 | * | 1/2007 | Youm ......................... 318/375 |
| 2005/0092577 A1 | * | 5/2005 | Nickey et al. ........... 198/345.1 |
| 2005/0122078 A1 | * | 6/2005 | Hashimoto et al. ......... 318/449 |

* cited by examiner

*Primary Examiner*—Lincoln Donovan
*Assistant Examiner*—Antony M. Paul
(74) *Attorney, Agent, or Firm*—Spencer T. Smith

(57) ABSTRACT

A machine for operating on a glass bottle. A carriage is displaceable by a servo motor having three lead lines. The rotation of the servo motor is stopped when power has been removed by shorting regenerative resistors to the three motor leads. The stopped servo motor is held at its stopped position by connecting a direct current power supply to two of the three servo motors.

3 Claims, 2 Drawing Sheets

GLASS MACHINERY MOTOR CONTROL

The present invention relates to glass inspection machines which inspect formed bottles to identify defects.

BACKGROUND OF THE INVENTION

Glass inspection machines usually have a number of inspection stations at which a bottle carried through the machine will be inspected for defects. The machine may be an indexing, star wheel type machine. One or more of these inspection stations will include a stroke mechanism for displacing the inspection device from an up, retracted position, to a down, inspection, position. One such inspection device might be bottle specific gages mounted to a carriage. The carriage travels up and down on a linear guide system. The carriage is clamped to a timing belt that is supported by two pulleys. One of the two pulleys is attached to a gear head. The gear head is attached to a permanent magnet servo motor which is supplied by a suitable amplifier. The servo motor assembly contains a spring actuated, electromagnetically released, friction brake.

Machines will have an emergency stop button. If the E-Stop button is pressed or if the machine detects a dangerous condition, the machine stops the motion of all servo motors as fast as possible, pauses, drops the current that holds the motor brake in a released state, and releases the high voltage contractor (the motors are not moving when the brake is applied). In the E-Stopped state the star wheel is at a random position, and the stroke mechanisms are held at a random height. The star wheel may be moved by hand, the stroke mechanisms may not.

In the case of a power failure, the high voltage ceases to be available to the servo motors, the carriages continue in whatever direction they were headed. The current that holds the motor brake in a released state drops; the brake engages and stops the motor shaft from turning. This is the only condition that causes the brake to stop the rotation of the motor shaft. In the power failed state the star wheel is at a random position, and the stroke mechanisms are held at a random height. The star wheel may be moved by hand, the stroke mechanisms may not. The machine will remain in this state until power is restored and the start sequence is initiated.

The brake in the machine keeps the machine from damaging itself during a power failure and makes it easier to work on the machine during maintenance and set-up. If the stroke mechanisms did not have brakes, the mechanisms would move downward and hinder the technician's ability to move the star wheel during setup (E-Stop is recommended during set-up). The problem with the current design is that the brakes are not reliable. The brakes wear, create brake dust and fail. The failure causes the machine to shut down.

OBJECT OF THE INVENTION

It is an object of the present invention to eliminate the requirement to use a motor with an internal brake.

Other objects and advantages of the present invention will become apparent from the following portion of this specification and from the accompanying drawings which illustrate, in accordance with the mandate of the patent statutes, a presently preferred embodiment incorporating the principles of the invention.

BRIEF DESCRIPTION OF THE PREFERRED EMBODIMENT

Figure 1:
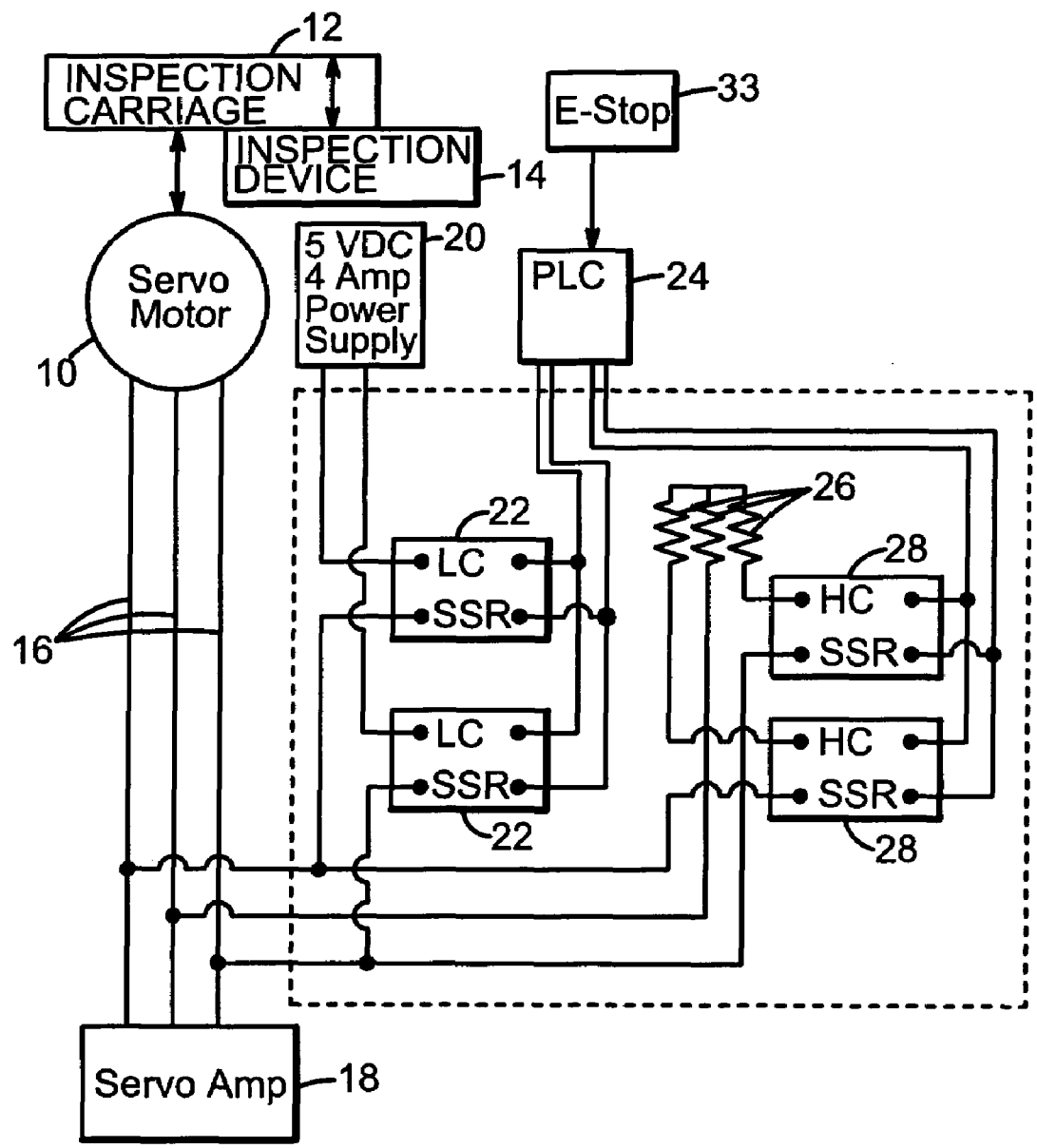
FIG. 1 is a schematic showing of a glass container inspection machine having an inspection device displaced by a servo motor and the control circuit for operating the motor in normal or E-stop modes.

FIG. 1 shows a servo motor 10 operating an inspection machine carriage or slide 12 which is displaceable in a selected direction to displace an inspection device 14 between retracted and advanced positions. At the advanced position the device can carry out a desired inspection on a glass bottle (not shown), for example. The servo motor 10 is a three phase motor having three power leads 16 and is operated in normal operation or normal stop by a servo amplifier 18 which carries out a desired displacement profile.

A 5 Volt D.C., 4 Amp Power Supply 20 is connectable to two of the three power leads of the servo motor 10 when a pair of Low Current Solid State Relays (LC SSR) 22 are operated via signals from a PLC 24. The three power lines 16 are connectable to three high current circuits each having a regenerative resistor 26 when a pair of High Current Solid State Relays (HC SSR) 28 are operated via signals from the PLC.

Figure 2:
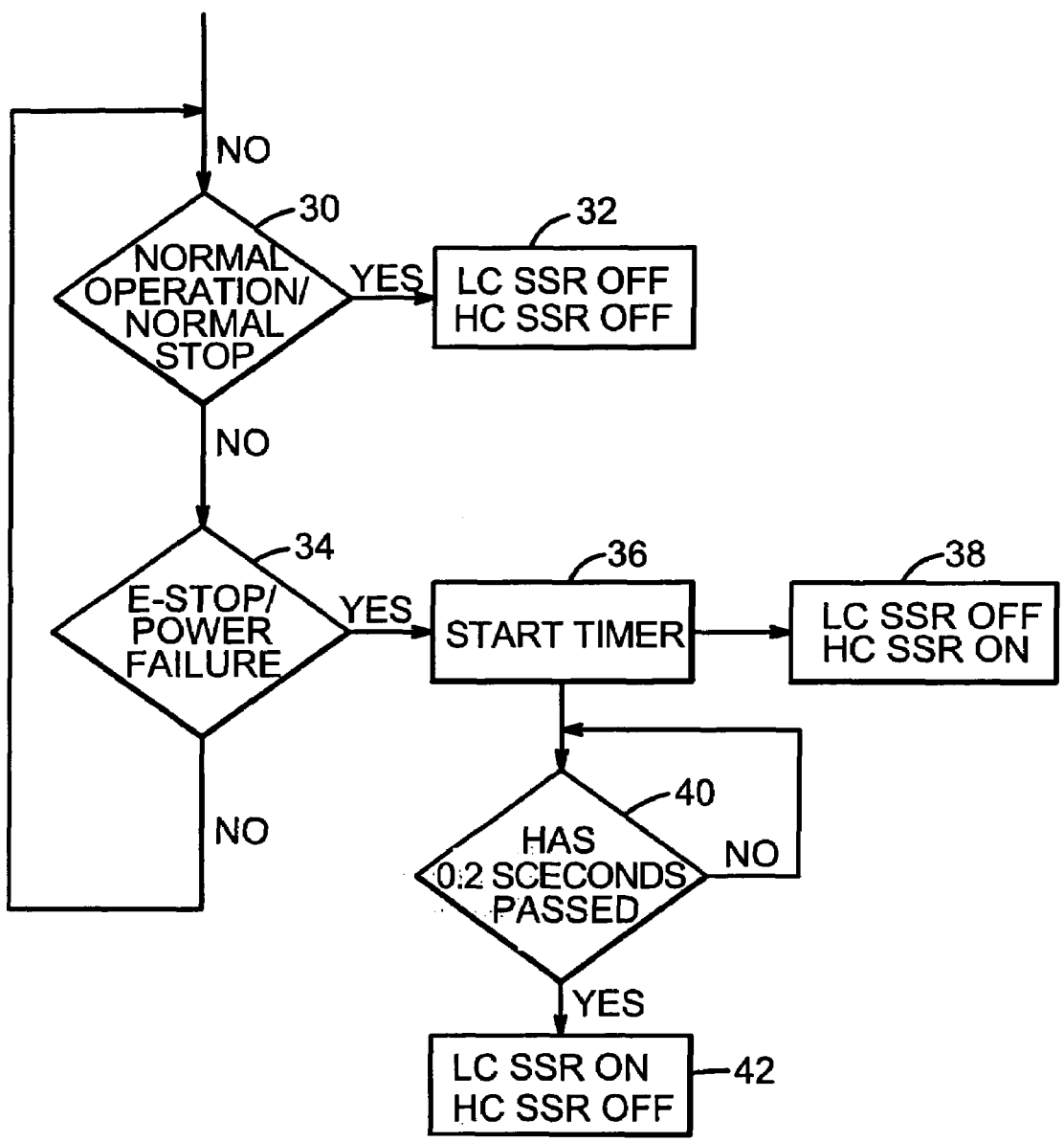
FIG. 2 is a logic diagram illustrating the operation of the control circuit illustrated in FIG. 1.

Referring to FIG. 2, during Normal Operation/Normal Stop 30, the Low Current Solid State Relays 22 and the High Current Solid State Relays 28 are "off" 32. The Servo motor 10 will accordingly be conventionally controlled by the servo amplifier via the three power leads.

In the event the E(emergency)-stop 33 is engaged, (E-Stop/Power Fails) 34, power will be removed from the servo amplifier 18 and the control will Start Timer 36 and the PLC 24 sends High Current Solid State Relay Control Signals to the pair of High Current Solid State Relays 28 to actuate the relays which connect the three power leads to the regenerative resistors 26 shorting the three motor windings together (LC SSR "off"/HC SSR "on" 38). The back EMF created by the servo motor 10 will slow the rotational output of the servo motor 10, stopping the servo motor 10. Once motor rotation has been stopped (Has 0.2 seconds Passed 40, for example), the High Current Solid State Relay Control Signals will be removed thereby disconnecting the three regenerative resistors 26 from the three motor lead lines. At the same time the PLC 24 sends Low Current Solid State Relay Signals to the pair of Low Current Solid State Relays which then operate to connect the DC Voltage (5 VDC/4 Amp Power Supply, for example) across two of the three servo motor 10 windings to hold the motor where it has stopped (HO SSR "off"/LC SSR "on" 42).

This design has the following points in its favor:
No moving parts (if solid state relays are used) therefore, no problems with wear.
The high currents caused by braking are borne by passive components (resistors). Therefore, the DC Power supply need not be sized to endure 20+ amps of current.
Because the brakes have been removed from the system, the cost of the system has been reduced.
Because the brakes have been removed from the system, the reliability of the system has been increased.

The invention claimed is:
1. A machine comprising
a displaceable device,
means for displacing said displaceable device including a servo motor having three lead lines,
means for stopping the rotation of the servo motor including
an E-stop,
regenerative resistor means,
first circuit means including high current relays connecting said regenerative resistor means to the three motor leads, and means for operating said high current relay means when the E-stop is operated to stop the rotation of said servo motor, and holding means for holding the stopped servo motor at its stopped position including a direct current power supply, second circuit means connecting two of said three servo motor leads to said direct current power supply, said second circuit means including low current relay means, and a control for operating said low current relay means when the rotation of said servo motor has stopped following the operation of the E-stop.

2. A machine according to claim 1, wherein said machine is a glass bottle inspection machine.

3. A machine according to claim 2, wherein said displaceable device is a carriage supporting an inspection device.

* * * * *